United States Patent
Hums et al.

(10) Patent No.: US 6,368,566 B1
(45) Date of Patent: Apr. 9, 2002

(54) FLUE GAS PIPE AND METHOD FOR TREATING FLUE GAS

(75) Inventors: Erich Hums, Hessdorf; Andreas Klatt, Nürnberg; Horst Spielmann, Baiersdorf; Christoph Brandt, Wenden; Werner Niggeschmidt, Olpe, all of (DE)

(73) Assignee: Apparatebau Rothemuhle Brandt & Kritzler GmbH, Wenden-Rothemuhle (DE)

(*) Notice: Subject to any disclaimer, the term of this patent is extended or adjusted under 35 U.S.C. 154(b) by 0 days.

(21) Appl. No.: 09/463,650
(22) PCT Filed: Jul. 15, 1998
(86) PCT No.: PCT/EP98/04408
§ 371 Date: Mar. 30, 2000
§ 102(e) Date: Mar. 30, 2000
(87) PCT Pub. No.: WO99/04888
PCT Pub. Date: Feb. 4, 1999

(30) Foreign Application Priority Data

Jul. 24, 1997 (EP) .............................. 97112724

(51) Int. Cl.[7] ............................ B01D 47/00; B01J 8/00; C01B 8/00
(52) U.S. Cl. ................. 423/210; 423/239.1; 423/245.1; 423/247; 588/205; 588/206; 588/228; 422/173; 422/175
(58) Field of Search .............................. 423/245.1, 210; 588/239.1, 206, 228, 205; 422/173, 175

(56) References Cited

U.S. PATENT DOCUMENTS

| | | | | |
|---|---|---|---|---|
| 3,870,474 A | * | 3/1975 | Houston | 23/277 C |
| 4,198,379 A | * | 4/1980 | James | 423/239 |
| 4,818,355 A | * | 4/1989 | Kanter et al. | 204/170 |
| 4,871,522 A | * | 10/1989 | Doyle | 423/239 |
| 5,325,795 A | * | 7/1994 | Nelson et al. | 110/236 |

* cited by examiner

Primary Examiner—Steven P. Griffin
Assistant Examiner—Edward M. Johnson
(74) Attorney, Agent, or Firm—Herbert Dubno

(57) ABSTRACT

The invention relates to a flue gas pipe (1) of an incineration plant, comprising a reaction zone (2) for breaking down harmful substances and a heat exchanger (3) for cooling the flue gas (R) which is mounted downstream and fitted with a dioxin catalytic converter (4). The dioxin catalytic converter (4) in the heat exchanger (3) makes it possible to prevent the renewed formation of dioxins by de novo synthesis when the temperature drops.

4 Claims, 1 Drawing Sheet

FLUE GAS PIPE AND METHOD FOR TREATING FLUE GAS

CROSS REFERENCE TO RELATED APPLICATIONS

This application is a national stage of PCT/EP981/04408 filed Jul. 15, 1998 and based upon 97112724.6 filed Jul. 24, 1997 under the International Convention.

FIELD OF THE INVENTION

The invention relates to a flue gas pipe with a reaction zone and a heat exchanger arranged downstream thereof, as well as to a method of treating flue gas.

BACKGROUND OF THE INVENTION

A flue gas pipe for the transport and treatment of flue or exhaust gases is used in a combustion installation, such as a power plant running on fossil fuel or a garbage incinerator.

In the reaction zone the flue gas is thermally or catalytically treated, in order to break down possible harmful substances. Also in a reaction zone of this type so-called adsorbents are used for the capture and storage of harmful substances. Such a reaction zone is for instance a reactor traversed by the flue gas with a specifically acting catalyst arranged therein.

In the downstream heat exchanger the flue gas is cooled before it reaches the environment. It is also known to return the heat obtained from the flue gas back into the combustion process, for instance for heating the combustion air. Such a heat exchanger suitable for this purpose is also known as regenerative heat exchanger.

In the combustion of organic matter or of household refuse which represents a mixture of organic and synthetic materials, besides carbon monoxide, nitrogen oxides and hydrocarbons, dioxins can result, and even in minimal amounts are toxic to humans. The "dioxins" are a collection of cyclically halogenated aromatic polyethers. To this group pertain the cyclic ethers (furanes), as well as the cyclic diethers (the actual dioxins). As particularly toxic representatives the polychlorinated dibenzodioxin (PCDD) and the polychlorinated dibenzofurane (PCDF) should be mentioned here.

In order to eliminate the mentioned harmful substances, specifically acting catalysts can be used in the reaction zone of the flue gas pipe.

The EP 0 447 537 B1 describes a catalytic conversion system for the elimination of nitrogen oxides and dioxins from the flue gas of a garbage-incinerating plant. Here a standard DeNOx-catalytic converter, which working according to the known SCR-process of the selective catalytic reduction with the addition of a reducing agent, reduces nitrogen oxides to molecular nitrogen and water, and an oxidation catalytic converter which oxidizes dioxins are arranged in series. Both catalytic converters basically contain titanium dioxide $TiO_2$, tungsten trioxide $W0_3$, vanadic pentoxide $V_2O_5$ and optionally molybdenum trioxide $MoO_3$.

Also from DE 43-04 323 A1 a catalytic conversion system for the removal of nitrogen oxides $NO_x$, carbon monoxide Co and dioxins is known. There in the flow direction of the flue gas of a combustion installation, a reduction or SCR-catalytic converter precedes an oxidation catalytic converter and the latter precedes a dioxin catalytic converter.

There are also known catalytic converters which, contrary to the SCR-catalytic converters, remove the nitrogen oxides contained in the flue gas without using separate reduction agents. These catalytic converters are generally defined as SCD-catalytic converters (SCD=Selective Catalytic Decomposition).

It is also known to thermally break down the dioxins contained in the flue gas by heating it in a reaction zone to a temperature over 800° C.

Further from EP 0 502 443 B1 it is known to perform the decomposition of nitrogen oxides directly in a regenerative heat exchanger, by means of a SCR-catalytic converter arranged therein.

However it has been found that when using a heat exchanger arranged downstream of the reaction tone, the flue gas reaching the environment contains again dioxins in amounts which can not be dismissed.

OBJECT OF THE INVENTION

Therefore it is the object of the invention to reliably avoid dioxin emissions into the environment in a flue gas pipe with a reaction zone and a subsequently arranged heat exchanger.

SUMMARY OF THE INVENTION

According to the invention this task is achieved by a flue gas pipe with a reaction zone for breaking down harmful substances contained in the flue gas and a heat exchanger for cooling the flue gas arranged downstream thereof, whereby the heat exchanger comprises a dioxin catalytic converter designed for breaking down dioxins.

The invention starts out from the concept that in a flue gas of a combustion installation at a temperature between 250 and 400° C. a renewed formation of dioxins takes place through a so-called de novo synthesis. The mechanism of this de novo synthesis is described in detail in the VDI Reports No. 634, 1987, pages 557 to 584. Dioxins are formed in the presence of oxygen from organic compounds which have not burned and metal chlorides, whereby in a first stage available heavy metal components catalyze a chlorine formation from the mentioned metal chlorides. Since the compounds responsible for a de novo synthesis are present in the flue gas of a power plant running on fossil fuel or of a garbage incinerator even after the catalytic treatment of the flue gas takes place, each heat exchanger arranged downstream of the reaction zone, as a result of the performed temperature reduction, represents a potential source for renewed dioxin formation. Particularly since, as a rule, in a subsequent beat exchanger the flue gas is cooled to a temperature of less than 400° C.

However such a renewed formation of dioxins in the flue gas after the already performed treatment of harmful substances is safely avoided when the heat exchanger arranged downstream of the reaction zone contains a dioxin catalytic converter equipped for the breakdown of dioxins. In this way on the one hand the renewed formation of dioxins is avoided when the temperature drops, and on the other hand already formed dioxins are decomposed into inoffensive substances.

As a dioxin catalyst for instance a catalyst can be used which contains $TiO_2$, $R\backslash WO_3$, $V_2O_5$ and optionally $MoO_3$. The content of $V_2O_5$ has thereby to be adjusted to the conditions of the flue gas. A catalyst in plate, honeycomb or pellet form is suitable.

It is particularly cost-effective and technically simple when the heat exchanging element of the heat exchanger is formed by the dioxin catalytic converter itself, and the heat exchange takes place on the same. For this purpose a correspondingly coated honeycomb or plate-shaped catalyst is particularly suited, which due to the large specific surface has also a high heat storage capacity.

The efficiency of the combustion installation increases when the used heat exchanger is a regenerative heat exchanger. Such a regenerative heat exchanger on one hand extracts the heat front the flue gas and on the other band returns the extracted heat back into the combustion process of the combustion installation. This can take place for instance by heating the combustion air.

The dioxin content of the flue gas can be further reduced when the reaction zone comprises an additional dioxin catalytic converter or a dioxin adsorber. For instance a honeycomb or plate-shaped catalyst of an already mentioned composition on a titanium dioxide basis is suitable. A dioxin catalytic converter in the form of charge or in the form of pellets is also conceivable.

Particularly the arrangement in series of a dioxin catalytic converter with a DeNOx-catalytic converter in the reaction zone offers advantages in that, under substantially identical reaction conditions, it is possible to remove simultaneously nitrogen oxides and dioxins from the flue gas. Since both catalytic*converters have a similar chemical composition, it is possible to provide a single catalyst carrier for both catalytic converters.

The invention also comprises a method for flue gas treatment, whereby a flue gas of a combustion installation flows first through a reaction zone for the removal of harmful substances and is subsequently passed over a downstream-arranged heat exchanger for cooling, whereby the flue gas is contacted in the heat exchanger with a first dioxin catalytic converter breaking down the dioxins.

A particularly effective decomposition of dioxins and nitrogen oxides can be achieved when the flue gas in contacted in the reaction zone first at a temperature of 300 to 500° C. with a DeNOx catalytic converter and/or with an additional second dioxin catalytic converter and subsequently is passed for cooling over the heat exchanger with the first dioxin catalytic converter.

SPECIFIC DESCRIPTION

Figure 1:
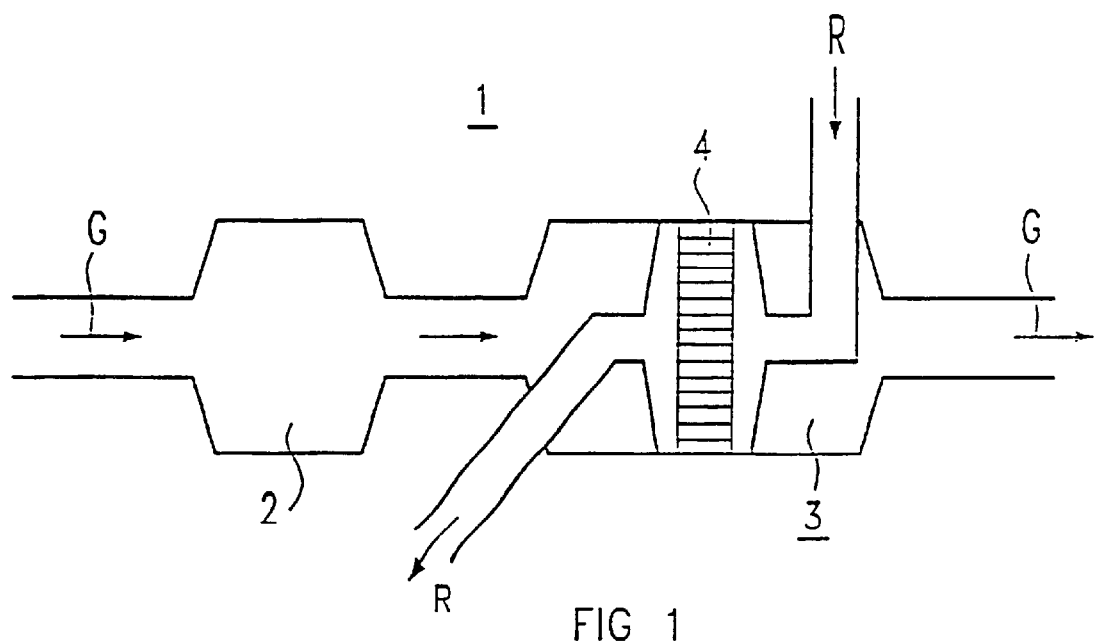
FIG. 1 is a schematic section through a flue gas pipe with a reaction zone and a heat exchanger arranged downstream thereof.

FIG. 1 represents schematically a flue gas pipe 1 of a combustion installation, particularly a garbage-incinerating plant not illustrated here in greater detail. The flue gas pipe 1 comprises a reaction zone 2 and a heat exchanger 3 arranged downstream thereof, which is designed as a regenerative heat exchanger. For the exhaust gas treatment, the flue gas G, which besides harmful gaseous substances such as nitrogen oxides, carbon monoxide, unburnt organic compounds and dioxins, contains also solid components such as dusts containing heavy metals and metal chlorides, passes at first through the reaction zone 2 for the breakdown of harmful substances. There the harmful gaseous substances are removed for instance thermally or catalytically. Normal temperatures for the catalytic removal of nitrogen oxides or dioxins range thereby between approximately 300 and 500° C. For a thermal decomposition of the dioxins the flue gas is heated above 800° C.

After a successful removal of harmful substances, the flue gas G flows through the subsequent heat exchanger 3. There the flue gas G is cooled down to a temperature lower than 400° C. The extracted heat is directed again to the combustion process of the combustion installation. For this purpose the flue gas G flows through a heat exchanging element of the heat exchanger 3, which in the embodiment example of FIG. 1 is a dioxin catalytic converter 4 having a honeycomb shape. The dioxin catalytic converter consists basically of titanium oxide $TiO_2$ and tungsten trioxide $WO_3$. The freely accessible surface has a content of vanadic pentoxide $V_2O_5$ of approximately 20%. By rotating the dioxin catalytic converter 4 about the longitudinal axis of the flue gas pipe 1, the heated part of the dioxin catalytic converter 4 is turned into a laterally arranged fresh air duct, whereby the stored amount of heat is released to a clean gas R flowing through the fresh air duct. The thereby heated clean gas R is fed (here not illustrated) to the combustion of the combustion installation. After passing through the heat exchanger 3, the flue gas G is finally released into the atmosphere through a stack which is not illustrated As a result of the dioxin catalytic converter 4 arranged as heat exchanging element in the heat exchanger 3, a renewed formation of dioxin through de novo synthesis can be prevented during the temperature drop in subsequently arranged heat exchanger 3.

Figure 2:
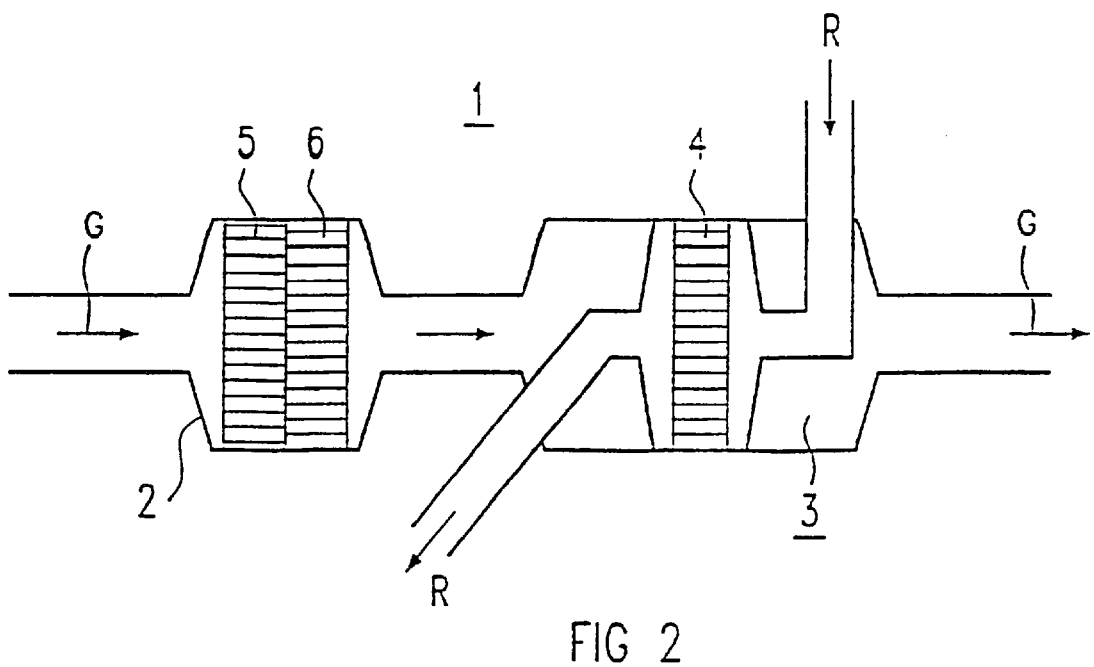
FIG. 2 is a schematic section through a flue gas pipe with a reaction zone and a heat exchanger arranged downstream thereof, whereby the reaction zone comprises a combined DeNOx/dioxin catalytic converter.

Like FIG. 1, FIG. 2 shows a flue gas pipe 1, wherein a DeNOx catalytic converter 5 and a dioxin catalytic converter 6 connected in series are arranged in the reaction zone 2. Here the two catalytic converters are carrier catalysts, each with a honeycomb-shaped carrier. Basically the carrier consists in both catalytic converters 5, 6 of titanium dioxide $TiO_2$ and tungsten trioxide WO3. The DeNOx catalytic converter 5 and the dioxin catalytic converter 6 each have vanadic pentoxide $V_2O_5$ in the surface freely accessible to the flue gas.

What is claimed is:

1. A method of treating a flue gas, comprising the steps of:

(a) obtaining from a combustion of organic substances and synthetic materials a flue gas containing carbon monoxide, nitrogen oxides, hydrocarbons and dioxins;

(b) passing the flue gas obtained in step (a) through a flue gas pipe and in a catalytic reaction zone containing catalysts at least for removal of the nitrogen oxides, removing harmful components from said flue gas including carbon monoxide, nitrogen oxides and dioxins, to produce a flue gas at a temperature above 400° C. susceptible to de novo synthesis of dioxins on cooling;

(c) then passing the flue gas at said temperature above 400° C. through a previously cooled regenerative heat exchanger constituting a dioxin converter and disposed along said pipe downstream of said reaction zone to cool the flue gas to a temperature below 400° C. without de novo synthesis of dioxin; and (d) releasing the flue gas cooled in step (c) into the environment.

2. The method defined in claim 1 wherein, in said reaction zone, the flue gas obtained in step (a) is first contacted with a DeNox catalytic converter at a temperature of 300 to 500° C. to break down nitrogen oxides and is then contacted in said reaction zone with a further dioxin catalytic converter.

3. A flue gas pipe connected to a system for combustion of organic substances and synthetic materials and through which a flue gas containing carbon monoxide, nitrogen oxides, hydrocarbons and dioxins is passed, said flue gas pipe having a catalytic reaction zone containing catalysts at least for removal of the nitrogen oxides and removing harmful components from said flue gas including carbon monoxides, nitrogen oxides and dioxins to produce a flue gas at a temperature above 400° C. susceptible to de novo synthesis of dioxins on cooling; and a regenerative heat exchanger downstream of said reaction zone and constituting a dioxin converter capable of cooling the flue gas to a temperature below 400° C. without de nova synthesis of dioxin.

4. The flue gas pipe defined in claim 3 wherein said reaction zone comprises a dioxin catalytic converter connected in series with a further dioxin catalytic converter.

* * * * *